United States Patent [19]

Muto

[11] Patent Number: 4,516,593
[45] Date of Patent: May 14, 1985

[54] PLUMBING REPAIR DEVICE AND METHOD

[76] Inventor: Anthony Muto, 2817 Aberdeen Ave., Ashtabula, Ohio 44004

[21] Appl. No.: 609,827

[22] Filed: May 14, 1984

[51] Int. Cl.³ .................... F16K 43/00; F16L 55/14
[52] U.S. Cl. ................... 137/15; 29/157.1 R; 29/213 R; 137/68 R; 137/318; 251/8; 285/197; 408/87
[58] Field of Search ............... 137/15, 68 R, 70, 315, 137/318; 251/7, 8; 29/157.1 R, 213; 222/5, 85; 408/87; 285/197, 198, 199

[56] References Cited

U.S. PATENT DOCUMENTS

| | | | |
|---|---|---|---|
| 2,875,777 | 3/1959 | Lacart | 137/318 |
| 2,994,337 | 8/1961 | Freeman | 251/8 |
| 3,030,828 | 4/1962 | Callen | 137/318 |
| 3,817,271 | 6/1974 | Roven | 137/318 |
| 4,018,546 | 4/1977 | Gebelius | 137/318 |
| 4,044,989 | 8/1977 | Basel et al. | 251/7 |
| 4,205,697 | 6/1980 | Gebelius | 137/318 |
| 4,434,809 | 3/1984 | Rogstadius | 137/318 |

Primary Examiner—George L. Walton
Attorney, Agent, or Firm—Watts, Hoffmann, Fisher & Heinke Co.

[57] ABSTRACT

The present invention relates generally to plumbing repair devices and more particularly relates to a new and novel plumbing repair device and method which can be quickly and easily utilized in fluid (i.e. gas, liquid) systems whereby the fluid flow can be terminated, the repair made and the fluid flow re-established with a minimum of time and effort. The repair device and method of the present invention have particular application in such systems where conventional shut-off valves are not available and/or wherein, if they are available, they are not readily useable.

9 Claims, 9 Drawing Figures

PLUMBING REPAIR DEVICE AND METHOD

DESCRIPTION

1. Technical Field

The present invention relates generally to plumbing repair devices and more particularly relates to a new and novel plumbing repair device and method which can be quickly and easily utilized in fluid (i.e. gas, liquid) systems whereby the fluid flow can be terminated, the repair made and the fluid flow re-established with a minimum of time and effort. THe repair device and method of the present invention have particular application in such systems where conventional shut-off valves are not available and/or wherein, if they are available, they are not readily useable.

2. Background of the Invention

In the present invention, it has been recognized that there has been a need to isolate areas of a liquid system where no shut-off valve was installed or where, if shut-off valves were available, they were not readily useable for various reasons. For example, if shut-off valves are available they may not be readily accessible or it may simply be impractical to shut-down the system and/or to make a given repair in the system.

Heretofore, in order to obviate this problem it was known that it would be necessary to pre-install, if possible, a sufficient number of shut-off valves to anticipate repairs which would necessitate shut-off of the system or a part thereof. It will be appreciated that, while possible in theory, such is not the case in practice. In another method, it was known to utilize dry-ice wherein a box was constructed around the pipe to be repaired and filled with dry-ice crystals. In such cases, the liquid (i.e. water) would freeze and hence, allow the necessary repairs to be made downstream. It will be apparent that this was not an efficient way to make such repairs. In a further method, it was known to utilize a device that would squeeze the pipe together so as to shut off the liquid flow. In this case, the pipe was then reshaped to its original circular configuration to re-establish the liquid flow. In such method, it was necessary to utilize a number of hand tools or implements requiring multiple time consuming manual operations which did not lend to an efficient repair method.

In the dry-ice method, the dry ice itself is hazardous to store and handle, hard to obtain, and requires construction of a box around the pipe. It will be seen, therefore, that this method is not practical or even possible if the pipe carries a liquid, such as gas, or any oral type liquid, or a liquid that will not freeze or react favorably to such technique. Here also, it will be apparent that this method involves a considerable time element.

In the aforementioned squeeze technique, it was possible to shape and reform only copper pipe. Accordingly, continual use of this method would eventually weaken the pipe and ultimately lead to mechanical failure.

As will be seen hereinafter, the plumbing repair device method of the present invention overcomes the problems attendant in such prior methods as will be more fully discussed in the following description taken in conjunction with the accompanying drawings.

DISCLOSURE OF THE INVENTION

The present invention provides a new and novel plumbing repair device and method which can be effectively utilized at the site by relatively unskilled workmen to make repairs on plumbing systems (i.e. conduit, pipe or the like) of the type for delivering fluid flow, i.e. gases, liquids or the like.

Accordingly, the present invention provides a plumbing device which satisfies the need to isolate areas of a system where no shut-off valve was initially installed. Moreover, with the device of the present invention one may stop the flow, make the necessary repairs, and then re-establish the flow. One then has a shut-off valve for future repairs. More specifically, the plumbing device of the present invention allows repairs to be made without shutting down the entire system resulting in undue hardships by having to stop other operating equipment and/or other work areas that may be impractical to close-down during the repair operation.

Other further advantages and objects of the present invention will become apparent as the following description proceeds when taken in conjunction with the accompanying drawings.

BEST MODE FOR CARRYING OUT THE INVENTION

Figure 1:
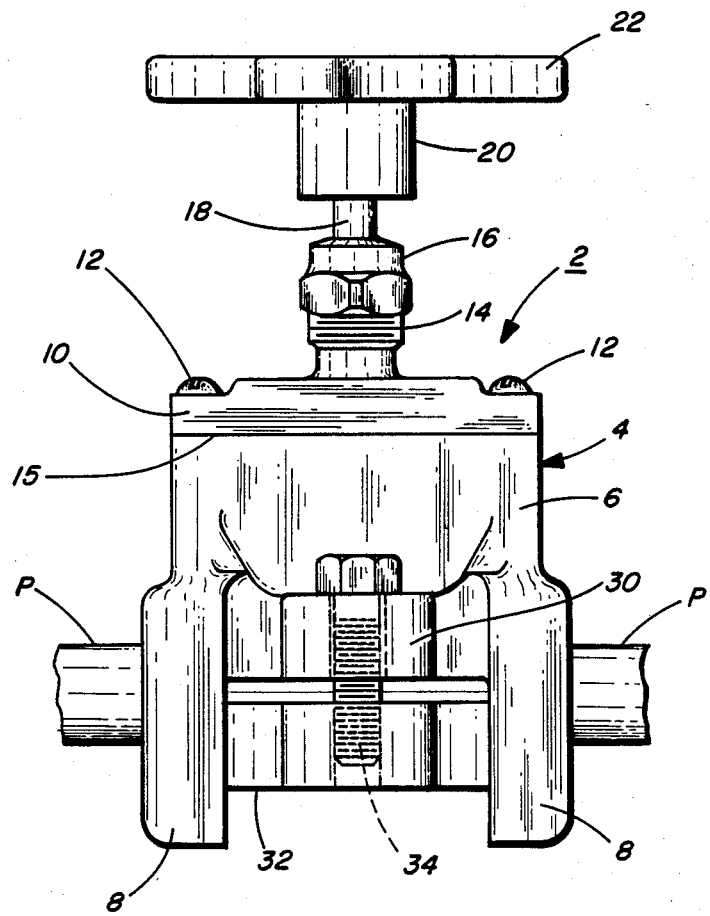
FIG. 1 is a side elevation view of the plumbing repair device of the present invention.
Figure 2:
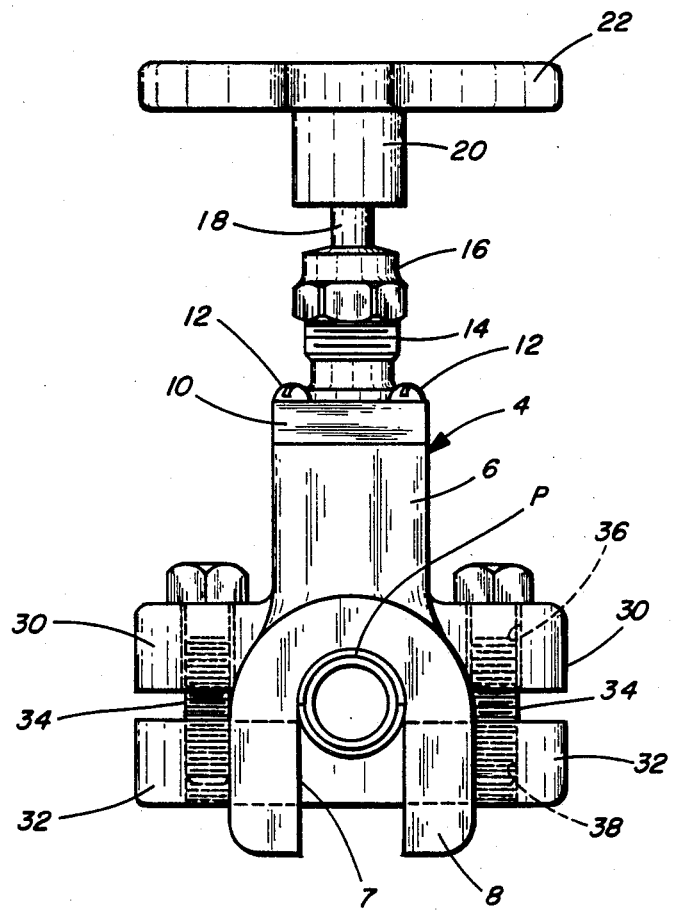
FIG. 2 is an end elevation view of the plumbing repair device illustrated in FIG. 1.

Referring again to the drawings and in particular to FIGS. 1 and 2 thereof, there is illustrated the plumbing device, designated generally at 2, made in accordance with the invention. Now in the invention, the device 2 includes a valve body member 4 having generally H-shaped base member 6 including two pair of laterally spaced, oppositely disposed and generally C-shaped (FIG. 2) leg members 8. A cap member 10 is detachably connected via screws, as at 12, to the valve body member 4. The cap member 10 mounts a threaded valve stem member 14 which receives a threaded nut 16 for securement of a valve stem member 18. The valve stem member 18 is rotatably actuated and controlled by a conventional handle 22 detachably connected via an integral collar 20 by means of a screw, as at 23, as known in the art.

The valve device, as illustrated in FIGS. 1 and 2, further includes a lower platen member 32 which is detachably connected to an upper fixed platen member 30 made integral with the valve base member 6. The lower platen member 32 is adjustably connected to the upper integral platen member 30 via a pair of machine screws 34 which enable the lower platen member to be vertically adjustable relative to the generally fixed upper platen member 30. The lower platen member 30 is constructed and arranged so as to slide vertically upwardly and downwardly (FIGS. 4 and 5) on generally flat cam surfaces, as at 9, provided in the C-shaped leg members 8 (four) of the valve base member 6. Accordingly, in the invention the pipe section, as at P, to be crimped and/or slit is inserted within the generally inverted U-shaped slot 7 (FIG. 2) and between the upper 30 and lower 32 platen members so as to define and establish therebetween the area of the pipe section to be isolated.

Now more specifically and with reference to FIGS. 3–9, the cap member 10, may be provided in a sealed relationship with the valve body by means of a fluid seal 17 which could be in the form of a gasket made from a suitable polymeric material such as urethane or the like. Specifically, the gasket may be made from a trademarked polymeric material made available under the trade name SILASTIC No. 738 or the like. The valve stem 18 is internally threaded, as at 21, and disposed within the threaded valve stem member 14 and is rotatably connected at its lower end to a piercing member 38. This rotatable connection includes an integral, reduced diameter groove 23 defined by enlarged collar portions 25 and 27 which provide the annular groove 23 therebetween. A pin element 19 extends transversely through the piercing member 38 and is received in the annular groove 23 of the valve stem so as to provide a rotatable connection therebetween. By this construction and arrangement, the piercing member 38 is generally free to pivot a slight amount in a longitudinal plane in the manner of a ball-joint connection relative to the mounting cap member 20 but is fixedly attached thereto. The valve system 18 rotates relative to the pin element 19 on the surface of its groove 23 to allow piercing member 38 to move up or down as the handle 22 is turned. This arrangement enables the piercing member 38 to be moved upwardly and downwardly within a hollow cavity, as at 47, provided in the valve base member 6 to facilitate the piercing or slitting operation.

Figure 3:
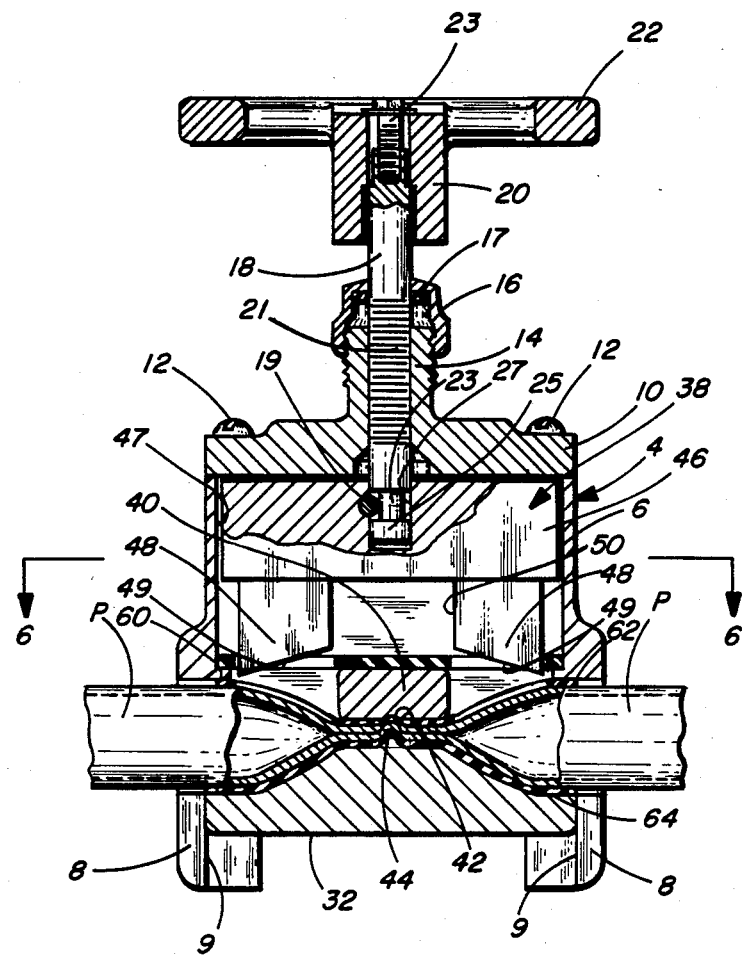
FIG. 3 is a vertical section view of the plumbing repair device illustrated in FIG. 1.
Figure 5:
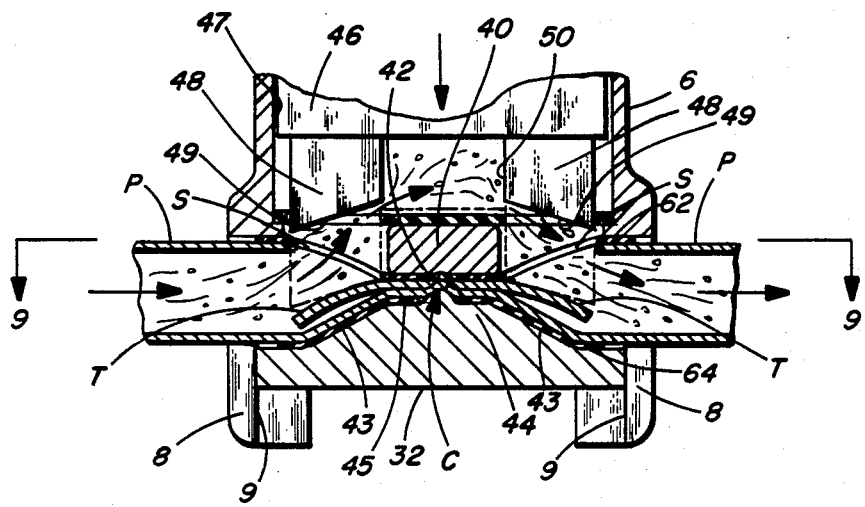
FIG. 5 is a fragmentary section view illustrating another step for crimping the pipe to re-establish flow through the valve body.
Figure 6:
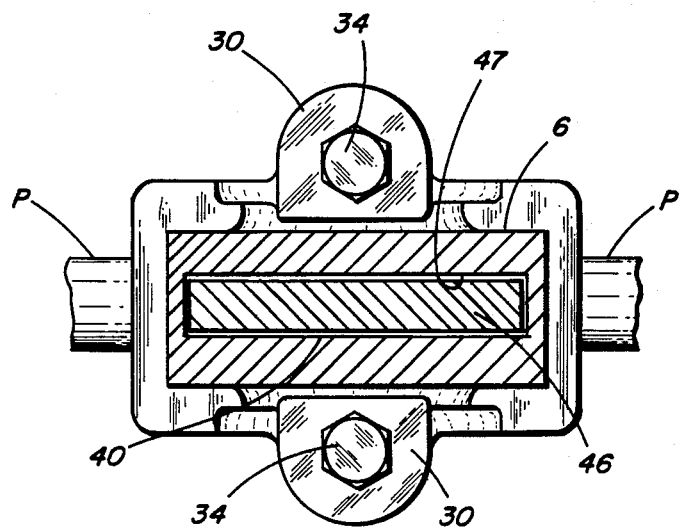
FIG. 6 is a horizontal section view taken along the line 6—6 of FIG. 3.
Figure 7:
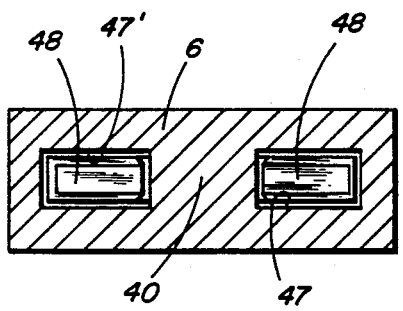
FIG. 7 is a horizontal section view taken along the line 7—7 of FIG. 4.
Figure 8:
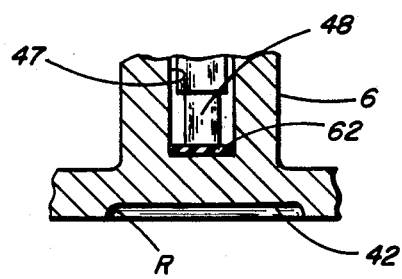
FIG. 8 is a fragmentary vertical view taken along the line 8—8 of FIG. 4.

The piercing member 38 has a cross-head member 46 and a pair of oppositely disposed, laterally spaced depending cutter blade elements 48 which have upwardly and inardly inclined cutting edges 49 for piercing engagement with the confronting surface of the pipe P to be pierced. If desired, the cutting blade elements 48 may be provided with hardened or wear resistant material such as carbide or the like. As illustrated in FIGS. 3 and 6, the cross-head member 46 extends transversely through the cavity 47 so as to be vertically movable upwardly and downwardly in a direction toward and away from the pipe P. In FIG. 7, the cutter blade elements 48 are separated by a stop-lug 40 which is made integral with the platen 30 and extends transversely of the cavity 47 (FIGS. 3, 4 and 5) and is received in a transverse space, as at 50, provided between the cutter blade elements 48. Accordingly, in the fully extended position of the valve stem 18, the cutter blade elements 48 are vertically movable through the pair of polygonal (rectangular) slots 47' (FIG. 7) defined by the lug 40 in the upper platen member 30.

Figure 4:
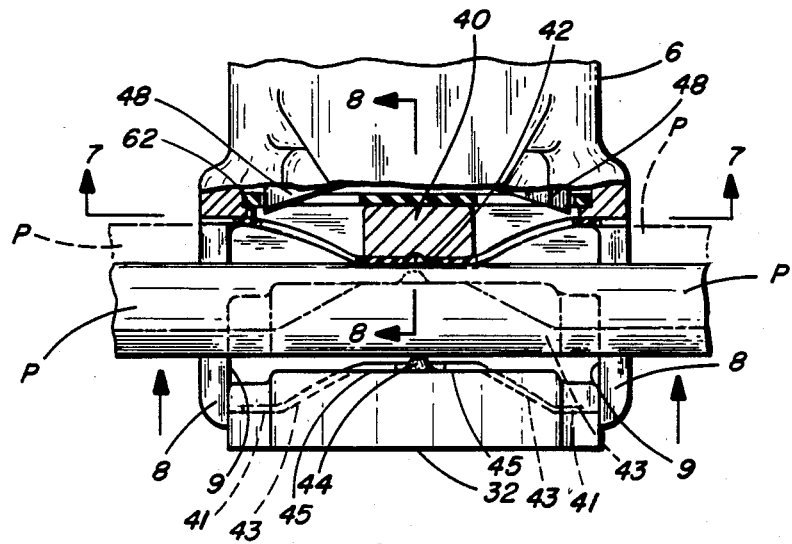
FIG. 4 is a fragmentary partially sectioned view illustrating one step in crimping the pipe to re-establish flow through the valve body.
Figure 9:
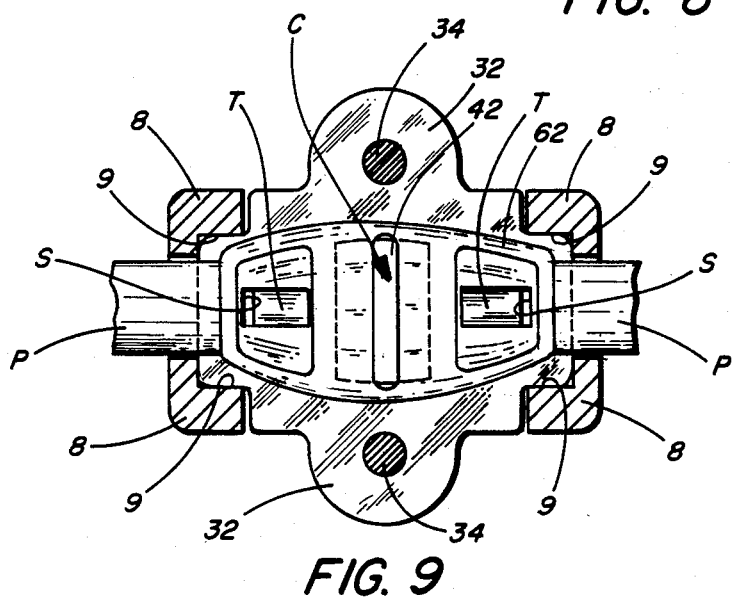
FIG. 9 is a fragmentary horizontal section view taken along the line 9—9 of FIG. 5.

The lower platen member 32 may be adjusted vertically upwardly so as to move the pipe P vertically upwardly toward the upper platen member 30 in the direction of the arrow, as illustrated in dotted line in FIG. 4. The lower platen member 32 includes a pair of generally flat surfaces 41 that merge into a pair of upwardly and inwardly inclined surfaces 43 that, in turn, merge into a raised and transverse crimping rib element 44 located between flat surfaces 45. The opposed surfaces 43 and 45 provide a generally truncated shape in vertical cross-section (FIG. 5) and flare upwardly and outwardly so as to conform to a correspondingly shaped configuration defined by the underlying confronting surface of the lug 40 in the upper platen 30. As illustrated in FIG. 9, the confronting under surface of the lug 40 in the upper platen 32 includes a transversely extending recess groove 42 so as to provide a crimp, as at C, in the pipe. Accordingly, the upper and lower platen surfaces are generally of a diametrically and symmetrically opposed configuration with the crimping rib 44 being received within the transverse recess 42 thereby providing the desired crimping operation to the pipe section.

In operation, the valve body member 4 is inserted over the area of the pipe section to be isolated and the lower platen member 32 assembled and then secured tight by the machine screws 34. Thus assembled, the crimping rib 44 and groove 42 arrangement enables the flow of fluid to be shut-off by reason of the sidewalls of the pipe being crimped, as C, together. The valve handle 22 is then actuated so as to drive the cutter blade elements 48 downwardly into piercing engagement with the pipe thereby to cut-out fingers or tabs, as at (FIG. 5), on the pipe section. The valve stem is actuated and the piercing member 38 is raised away from the slotted pipe thereby to provide a passageway for the free flow of fluid from one side of the pipe section to the other side thereof. Accordingly, piercing of the pipe to provide slots, as at S, then acts to re-establish flow or fluid through the valve body. By this arrangement, the device enables the flow to be turned-off or turned-on as required in the manner of a standard type shut-off valve. It has been found that the valve device of the present invention can be quickly and easily installed within approximately three minutes with normal hand tools.

Accordingly, in the present invention there is provided a new and novel fluid flow control device which can be quickly and easily installed for stopping, such as by crimping, the fluid flow and/or substantially simultaneously re-establishing such flow by piercing the soft deformable (i.e. copper) pipe to form slits or slots therein. Moreover, the flow control device of the invention can be used independently as a valve to stop fluid flow or to re-establish the same, as may be desired. In such case, the fluid flow control device may be left installed for either or both applications and subsequently removed for reuse. The invention, therefore, provides a simple yet rugged plumbing tool which, in effect, provides a one-step installation for performing one or both functions, as desired.

In the invention, three gaskets are required. For example, one gasket 60 is provided interiorly between surface 40 and the piercing member element 38, as at 60, for shutting off the flow of fluid once the pipe is pierced. An oppositely disposed pair of gaskets 62 and 64 are also provided in confronting relation on the exposed surfaces of the upper and lower platen members 32 and 30 so as to provide an interior seal to prevent leakage of fluid from the valve body during re-establishment of fluid flow after the desired pipe section has been repaired or replaced.

Accordingly, by the present construction and arrangement, there is provided a new and novel valve device which can effectively crimp-off an isolated pipe section to permit repair and/or replacement of some downstream pipe section and substantially simulatneously enables re-establishment of fluid flow around the crimped and isolated area in a single operation. At the present time, the valve device of the present invention has been developed for copper pipe and will be available in a variety of sizes. The device can be used on pipes transporting fluids such as gases or liquids. It is to be understood, however, that the present invention may be used with other types of pipe materials such as steel or the like with the addition of ancilliary power sources, such as hydraulic or the like, to actuate the crimping the piercing operation.

What is claimed is:

1. A fluid control device for use with readily deformable conduit, pipe made from copper or the like comprising a valve body member, said valve body member including a hollow casing defining an upper platen member, a lower movable platen member detachably connected to a said casing for selectively adjustable vertical movement relative to said upper platen member to receive said pipe in clamping relation therein upon vertical adjustment of said lower platen member, and said lower platen member including a raised, transverely extending rib means adapted to be received in a correspondingly shaped recess groove means provided in said upper platen member so as to crimp therebetween the corresponding area of said pipe section upon vertical movement of said lower platen member relative to said upper platen member, a unitary piercing member mounted for vertical movement within said casing and having an integral pair of oppositely disposed blade-like piercing elements adapted for simultaneous piercing of the material of said pipe section to form elongated slots to re-establish fluid flow on opposite sides of said pipe crimp, actuating means for selectively moving said blade-like elements toward and away from said pipe section, said casing having an interior cavity adapted to movably receive said piercing member therein with said piercing member occupying generally the full transverse area of said cavity, said cavity being open at the bottom and communicating with the exterior of said casing and having an integral stop-like lug portion formed in said upper platen member and defining closed openings on opposite sides therein, and said openings being adapted to receive therethrough said blade-like elements and said lug portion providing a stop to limit a piercing movement of said blade-like elements relative to said pipe section, said blade-like elements being laterally spaced apart and configured so as to pierce the said elongated slots in the pipe with said rib means disposed between said blade-like elements and transversely of said pipe for sequential crimping and re-establishment of fluid flow around the crimped area via the interior cavity of said casing.

2. A fluid flow control device in accordance with claim 1, when said blade-like elements each include inclined cutting edges adapted to slit the material of said pipe section upon movement of said blade-like elements towards the lower platen member.

3. A fluid flow control device in accordance with claim 2, wherein said lower platen member includes a generally truncated surface configuration, and said rib means extending outwardly from said surface and extending transversely relative to the longitudinal central axis of said pipe section.

4. A fluid flow control device in accordance with claim 1, wherein said pipe section is made of copper.

5. A fluid flow control device in accordance with claim 4, wherein said lug member defines an upper die face having a recessed groove adapted to receive therein said rib member for crimping said pipe section therebetween upon vertical movement of said lower platen member relative to said upper platen member.

6. A fluid flow control device in accordance with claim 4, when said actuation means includes a handle including a threaded valve stem member adapted to be threadedly relative to the cavity in said casing, and said piercing member being pivotally connected to said valve stem member.

7. A fluid flow control device in accordance with claim 6, wherein said piercing member includes a transverse head member including said blade-like elements which depend downwardly therefrom, said head member being attached to said valve stem member for generally pivotal movement about a horizontal axis extending transverse to longitudinal central axis of said pipe section.

8. A fluid control device in accordance with claim 1, wherein said piercing member is of a generally inverted U-shaped configuration with said blade-like elements made integral with and extending downwardly from a cross-head member, said cross-head member being pivotally connected to said valve stem member by means of a ball-joint connection to enable the blade-like elements to pivot in a generally horizontal plane about the vertical axis of said valve stem member.

9. A method for selectively controlling the fluid flow through a deformable pipe section made from a readily deformable materials such as copper or the like, said method comprising supplying a portable fluid flow control device to a predetermined selected area of said pipe section to be isolated, said device including a unitary piercing member having an integral pair of laterally spaced, oppositely disposed blade-like elements disposed within a hollow cavity of said control device for vertical movement toward and away from said pipe section so as to form by a simultaneous piercing action lengthwise extending openings therein, said piercing member occupying generally the full transverse area of said cavity during said vertical movement of said piercing member, and rib means being disposed relative to said blade-like elements for substantially simultaneously crimping said pipe section into a closed condition, intermediate said openings thereof to automatically close-off and then re-establish fluid flow around the crimped area upon formation of said openings by said piercing member.

* * * * *